US010863473B2

(12) United States Patent
Wong et al.

(10) Patent No.: US 10,863,473 B2
(45) Date of Patent: Dec. 8, 2020

(54) METHODS, NETWORK, INTEGRATED CIRCUITRY AND APPARATUS FOR TELECOMMUNICATIONS DEVICE LOCATION

(71) Applicant: Sony Corporation, Tokyo (JP)

(72) Inventors: Shin Horng Wong, Basingstoke (GB); Martin Warwick Beale, Basingstoke (GB); Brian Alexander Martin, Basingstoke (GB)

(73) Assignee: CONVIDA WIRELESS, LLC, Wilmington, DE (US)

( * ) Notice: Subject to any disclaimer, the term of this patent is extended or adjusted under 35 U.S.C. 154(b) by 0 days.

(21) Appl. No.: 16/324,126

(22) PCT Filed: Jul. 13, 2017

(86) PCT No.: PCT/EP2017/067746
§ 371 (c)(1),
(2) Date: Feb. 8, 2019

(87) PCT Pub. No.: WO2018/028925
PCT Pub. Date: Feb. 15, 2018

(65) Prior Publication Data
US 2019/0182794 A1    Jun. 13, 2019

(30) Foreign Application Priority Data
Aug. 10, 2016    (EP) ..................... 16183546

(51) Int. Cl.
*H04W 64/00*    (2009.01)
*H04W 52/02*    (2009.01)
*H04W 76/27*    (2018.01)

(52) U.S. Cl.
CPC ....... *H04W 64/00* (2013.01); *H04W 52/0209* (2013.01); *H04W 52/0216* (2013.01); *H04W 76/27* (2018.02); *Y02D 30/70* (2020.08)

(58) Field of Classification Search
CPC ....... H04W 4/02; H04W 4/029; H04W 4/023; H04W 64/00; H04W 88/08; H04W 4/021;
(Continued)

(56) References Cited

U.S. PATENT DOCUMENTS

2009/0280828 A1* 11/2009 Wang .................... H04W 64/00
455/456.1
2015/0215989 A1* 7/2015 Bangolae ............ H04L 65/1006
370/311
(Continued)

OTHER PUBLICATIONS

Hybrid TOA-AOA Location Positioning Techniques in GSM Networks (Wireless Pers Commun (2010) 54:321-348 DOI 10.1007/s11277-009-9728-x, Published online: May 12, 2009) (Year: 2009).*
(Continued)

*Primary Examiner* — George Eng
*Assistant Examiner* — Jing Gao
(74) *Attorney, Agent, or Firm* — Xsensus LLP

(57) ABSTRACT

A method for use in a wireless telecommunications network comprising a core network, two or more base stations each providing wireless connectivity within a base station cell, and a terminal device configured to communicate wirelessly with the base stations by a communication mode, and the method being a positioning method for determining a position of the terminal device, comprises sending one or more positioning signals between the base stations and the terminal device during a transmission phase of the method, and using measured arrival times of the positioning signals to triangulate a position of the terminal device, wherein during the transmission phase the terminal device is in an energy saving communication mode.

16 Claims, 6 Drawing Sheets

(58) Field of Classification Search
CPC . H04W 84/12; H04W 8/005; H04W 28/0236; H04W 28/0289; H04W 28/18; H04W 36/20; H04W 36/245; H04W 36/32; H04W 36/38; H04W 40/246; H04W 72/0453; H04W 72/082; H04W 72/1231; H04W 92/20; H04W 24/08; H04W 72/042; H04W 24/10; H04W 48/18; H04W 48/20; H04W 52/0245; H04W 52/0209; H04B 17/318; H04B 17/336; H04L 43/08; H04L 43/0864

See application file for complete search history.

(56) References Cited

U.S. PATENT DOCUMENTS

2016/0065338 A1* 3/2016 Kim .................. H04L 5/0048 370/330
2016/0345206 A1* 11/2016 Yerramalli ............ H04L 5/0091
2017/0303152 A1* 10/2017 Kim ........................ H04L 5/005

OTHER PUBLICATIONS

Holma et al., "LTE for UMTS OFDMA and SC-FDMA based radio access", John Wiley and Sons, 2009, 11 pages.
Vodafone, Huawei, HiSilicon, Ericsson, Qualcomm, "New work item proposal: Enhancements of NB-IoT", 3GPP TSG RAN Meeting No. 72 RP-161324, Busan Korea, Jun. 13-16, 2016, 8 pages.
Ericsson, "New WI proposal on Further Enhanced MTC", 3GPP TSG RAN Meeting No. 72 RP-161321 revision of RP-161319, Busan Korea, Jun. 13-16, 2016, 7 pages.
Deligiannis et al., "Hybrid TOA-AOA Location Positioning Techniques in GSM Networks", Wireless Personal Communication, vol. 54 No. 2, XP019832927, May 12, 2009, pp. 321-348.
International Search Report dated Oct. 2, 2017 for PCT/EP2017/067746 filed on Jul. 13, 2017, 8 pages.

* cited by examiner

US 10,863,473 B2

METHODS, NETWORK, INTEGRATED CIRCUITRY AND APPARATUS FOR TELECOMMUNICATIONS DEVICE LOCATION

CROSS-REFERENCE TO RELATED APPLICATIONS

The present application is based on PCT filing PCT/EP2017/067746, filed Jul. 13, 2017, and claims priority to 16183546.7, filed in the European Patent Office on Aug. 10, 2016, the entire contents of each of which are being incorporated herein by reference.

BACKGROUND

Field

The present disclosure relates to apparatus and methods for the location of telecommunications devices.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Mobile telecommunications systems, such as those based on the 3GPP defined UMTS and Long Term Evolution (LTE) and Long Term Evolution Advance (LTE-A) architectures, are applicable to communications between networked user devices such as mobile telephones, and more widely also to applications such as the Internet of Things (IoT), including enhanced machine type communications (eMTC) and the narrowband Internet of Things (NB-IoT). In all cases device positioning is of interest, allowing devices to be tracked, but this is of particular relevance to IoT devices. Moreover, such devices are preferably low cost, have good power efficiency and are able to operate with extended coverage, such as within building basements.

Positioning techniques which have been considered for IoT devices (but which are also applicable to other devices in a telecommunications network) include Observed Time Difference of Arrival (OTDOA) and Uplink Time Difference of Arrival (UTDOA). In OTDOA, the device measures time differences in the arrival at the device of downlink signals from a reference base station and one or more target base stations. These measurements are transmitted to a location server, which performs triangulation to calculate the device's position using the time difference measurements and the known locations of the base stations. In UTDOA, a related but opposite arrangement is used, in which the device transmits an uplink signal to multiple base stations. The base stations each measure the arrival time of this signal, which will differ according to the relative position of the device to each base station. The timings are sent to a location server which again calculates the device's position using triangulation.

In both OTDOA and UTDOA, the device sends or receives the timing signals in a fully connected mode, which has high power consumption and consequent detriment to device battery life.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
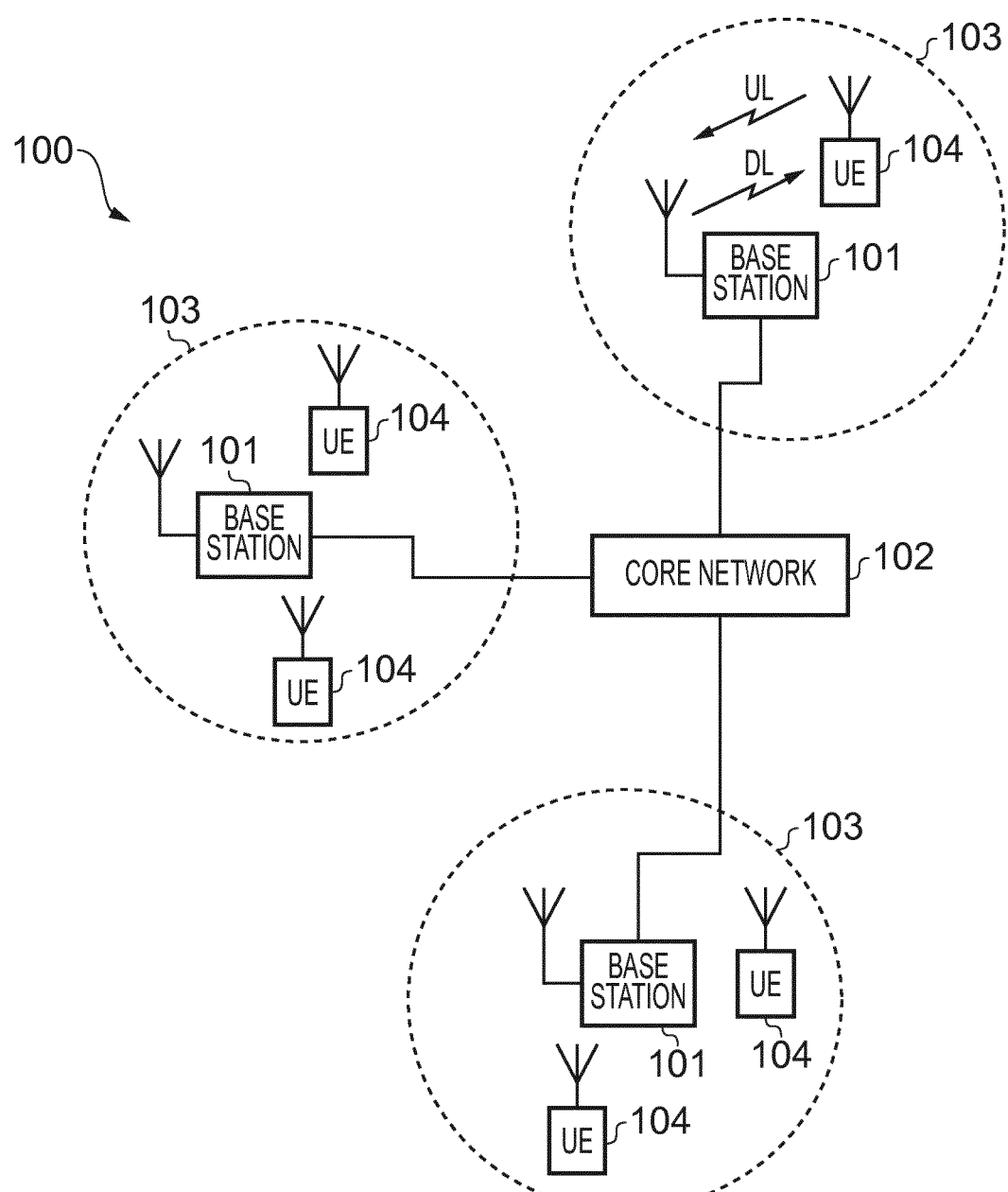
FIG. 1 shows a schematic representation of an example mobile telecommunications network or system.

FIG. 1 shows a schematic diagram illustrating some basic functionality of a mobile (cellular, wireless) telecommunications network/system, in this example operating generally in accordance with LTE principles, and which may be adapted to implement embodiments of the disclosure as described further below. Various elements of FIG. 1 and their respective modes of operation are well-known and defined in the relevant standards administered by the 3GPP® body, and also described in many books on the subject, for example, Holma, H. and Toskala, A. [1]. It will be appreciated that operational aspects of the telecommunications network which are not specifically described below may be implemented in accordance with any known techniques, for example according to the relevant standards and known variations thereof. Furthermore, it will be appreciated that whilst some specific examples described herein may refer to implementations based around particular 3GPP implementations, the same principles can be applied regardless of the underlying operating principles of the network. That is to say, the same principles can be applied for wireless telecommunications networks operating in accordance with other standards, whether past, current or yet to be specified.

The network 100 in FIG. 1 includes a plurality of base stations 101 connected to a core network 102. Each base station provides a coverage area or cell 103 within which data can be communicated to and from terminal devices or user equipment 104. Data is transmitted from base stations 101 to user equipment 104 within the respective coverage areas 103 via a radio downlink DL. Data is transmitted from user equipment 104 to the base stations 101 via a radio uplink UL. The uplink and downlink communications are made using radio resources that may be used by the operator of the network. The core network 102 routes data to and from each user equipment 104 via the respective base stations 101 and provides functions such as authentication, mobility management, charging and so on. In addition to the base stations 101 and user equipment 104, the system may further comprise one or more relay nodes/devices (not shown), which may be used to enhance coverage for user equipment operating in the relevant cell(s). The deployment of relay nodes (e.g. in terms of their locations) may follow generally established techniques for using relay nodes to support coverage in wireless telecommunications systems by assisting downlink and/or uplink communications. Regarding terminology, terminal devices may also be referred to as mobile stations, user equipment (UE), user terminal, terminal, mobile radio, mobile terminal, mobile device, or simply device, and so forth. Base stations may also be referred to as transceiver stations, nodeBs, e-nodeBs, eNBs and so forth.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

Figure 1A:
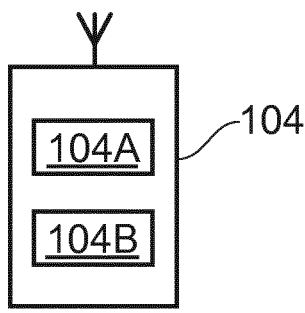
FIG. 1A shows a schematic representation of an example user equipment for use in a network such as the FIG. 1 example.

FIG. 1A shows a schematic representation of an example of a user equipment 104. The user equipment 104 comprises a transceiver unit 104A for transmission and reception of wireless signals and a processor unit 104B configured to control the user equipment. The processor unit 104B may comprise various sub-units for providing functionality in accordance with embodiments of the present disclosure as explained further herein. These sub-units may be implemented as discrete hardware elements or as appropriately configured functions of the processor unit. Thus the processor unit 104B may comprise a processor unit which is suitably configured/programmed to provide the desired functionality described herein using conventional programming/configuration techniques for equipment in wireless telecommunications systems. The transceiver unit 104A and the processor unit 104B are schematically shown in FIG. 1A as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the user equipment 104 will in general comprise various other elements associated with its operating functionality, for example a power source, user interface, and so forth, but these are not shown in FIG. 1A in the interests of simplicity.

Figure 1B:
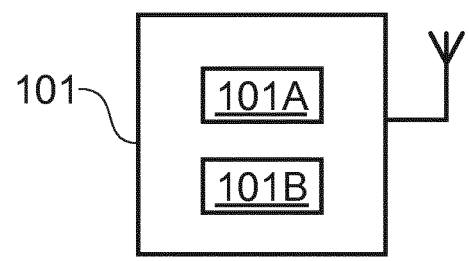
FIG. 1B shows a schematic representation of an example base station for use in a network such as the FIG. 1 example.

FIG. 1B shows a schematic representation of an example of a base station 101. In a network such as that in FIG. 1, each base station 101 may be functionally identical but each serves a different geographical area (cells 103). Each base station 101 comprises a transceiver unit 101A for transmission and reception of communications between the base station and any user equipment 104 in its cell, and the core network 102. A base station 101 further comprises a processor unit 101B configured to control the base station 101 to operate in accordance with embodiments of the present disclosure as described herein. The processor unit 101B may again comprise various sub-units for providing functionality in accordance with embodiments of the present disclosure as explained herein. These sub-units may be implemented as discrete hardware elements or as appropriately configured functions of the processor unit. Thus, the processor unit 101B may comprise a processor unit which is suitably configured/programmed to provide the desired functionality described herein using conventional programming/configuration techniques for equipment in wireless telecommunications systems. The transceiver unit 101A and processor unit 101B are schematically shown in FIG. 1B as separate elements for ease of representation. However, it will be appreciated the functionality of these units can be provided in various different ways, for example using a single suitably programmed general purpose computer, or suitably configured application-specific integrated circuit(s)/circuitry. It will be appreciated that the base station 101 will in general comprise various other elements, for example a power supply, associated with its operating functionality.

As is well understood, in wireless telecommunications networks such as an LTE type network, there are different Radio Resource Control (RRC) modes for terminal devices, including governing the connection state between the terminal device and a base station. For example, in addition to the device being wholly unconnected to the network (for example when the device is switched off), it is common to support an RRC idle mode and an RRC connected mode. Generally speaking, in RRC connected mode a terminal device is connected to a base station in the sense of being able to receive user plane data from the base station, whereas in RRC idle mode the terminal device is unconnected to a base station in the sense of not being able to receive user plane data from the base station. However, in idle mode the terminal device may still receive some communications from base stations, for example reference signalling for cell reselection purposes and other broadcast signalling. For the RRC idle mode, the core network (CN) part of the wireless telecommunications system recognizes that the terminal device is present within the network, but the radio access network (RAN) part of the wireless telecommunications system (i.e. comprising the base stations) does not. Thus, in broad summary, in RRC idle mode the terminal device is not connected to a base station, whereas in RRC connected mode the terminal device is connected/attached to a base station. The RRC connection setup procedure of going from RRC idle mode to RRC connected mode may be referred to as connecting to a cell/base station. The RRC idle state can be thought of as a limited or low radio connection, and the RRC connected state can be thought of as a full or high radio connection. The present disclosure is equally applicable to mobile telecommunications systems using these states within the 3GPP architecture and to other comparable limited states and full states defined within other telecommunications architectures and protocols. Accordingly, radio resource control states may be defined for the terminal to have a full connection or a limited connection with a base station. As used herein, a "full" connection or a terminal being "fully" connected (or simply "connected") with a base station refers to a radio resource control (e.g. RRC in 3GPP) state or mode in which the terminal can (among other functions) exchange user data and signalling with a base station. A "limited" or idle connection refers to a radio resource control state or mode in which the terminal cannot exchange user data with a base station, but still retains some communications functionality. For example, in a limited mode, the terminal may be configured to do one or more of: monitoring and receiving paging information, carrying out measurements, handling mobility (e.g. to another cell), and the like. Furthermore, in a limited mode the terminal may be able to receive data in a broadcast manner such as by MBMS (Multimedia Broadcast Multicast Services) or eMBMS (evolved MBMS).

One characteristic of the RRC connected mode is the allocation of a cell-specific radio network temporary identifier (C-RNTI) to the terminal device to allow the base station to which the terminal device is connected to address communications to the terminal device. A terminal device in a conventional RRC idle mode will not be associated with this kind of RNTI.

Another characteristic of the RRC connected mode is the association of one or more dedicated logical channels with the terminal device to allow the terminal device to exchange data with the base station to which it is connected. A terminal device in a conventional RRC idle mode will not be associated with this kind of dedicated logical communication channel.

Another characteristic of the RRC connected mode is that a terminal device in RRC connected mode will have established a security context by exchanging security settings with the base station to which it is attached as part of its RRC connection procedure. A terminal device in a conventional RRC idle mode will not have this kind of established security context.

More generally, a base station to which a terminal device is connected in RRC connected mode will retain information relating to the terminal device, for example its allocated C-RNTI, logical channel configuration settings, security settings, and so on, to allow the base station to communicate with the terminal device. This information may generally be referred to as a terminal device context in/at the base station. In accordance with conventional approaches, when a terminal device releases its RRC connection with respect to a particular base station and transitions to conventional RRC idle mode, the base station releases the terminal device context.

Whilst in RRC idle mode a terminal device will receive signalling from base stations covering its location (i.e. base stations within radio signalling range of its location), for example reference signalling and other broadcast signalling. Based on this signalling the terminal device is able to determine what is currently the most appropriate base station to connect to were the terminal device required to establish a connection to the network, for example to transmit uplink data or in response to a paging request. This ongoing procedure/process for determining the most appropriate base station to connect to is known as cell selection/reselection.

The terminal device will synchronise to a selected base station and decode relevant broadcast information, for example information transmitted in master information block (MIB) and system information block (SIB) transmissions, from the selected base station so the terminal device is able to initiate a radio resource connection with the selected base station as and when appropriate.

When a terminal device operating in an RRC idle mode wishes to transition to an RRC connected mode to exchange data with the network, it transmits an RRC connection request message to the currently selected base station to initiate an RRC connection procedure in accordance with well-established techniques. In association with the RRC connection procedure, signalling is exchanged between the terminal device and the base station to allow the base station to establish a context for the terminal device to support subsequent communications in the RRC connected mode, for example to exchange information relating to a C-RNTI for the terminal device, dedicated logical channel configuration settings, and security settings.

The use of RRC idle mode can be beneficial for a terminal device, for example in terms of power saving. However, a drawback of switching to RRC idle is the signalling overhead associated with establishing a new RRC connection when the terminal device is required to reconnect to a base station and exchange data with the base station to allow the base station to establish a context for the terminal device. This signalling overhead has an impact for the terminal device in terms of using power and also for the wireless telecommunications network as a whole in terms of taking up radio resources that might otherwise be used for other communications. Consequently, there is typically a compromise to be made between entering RRC idle mode frequently (to preserve terminal device power) and remaining in RRC connected mode for longer periods (to reduce re-connection signalling overhead).

In view of this issue, it has been recognised that certain wireless telecommunications systems may benefit from supporting a modified RRC idle mode in which the base station to which a terminal device was previously connected before entering idle mode retains/stores information regarding the terminal device context. Thus, when a terminal device reconnects to the network, some or all of this context information may be relied on to support subsequent communications without the base station and terminal device needing to re-exchange the information as part of a radio resource connection procedure, thereby reducing the signalling overhead associated with establishing the terminal device context at the base station. A terminal device which disconnects from a base station while the base station retains (at least some) context information relating to the terminal device in accordance with this approach may be referred to as being in an RRC suspend(ed) mode. That is to say, the terminal device may be considered to be in a mode in which its RRC connection to a base station is suspended, as opposed to the connection being released as with conventional idle mode. In many respects the RRC suspend mode may be considered to correspond to a special case of the RRC idle mode.

In accordance with currently proposed techniques, when a terminal device in the RRC suspend mode wishes to re-establish a connection to a currently selected base station (i.e. selected in accordance with the terminal device's conventional cell (re)selection procedures), the terminal device transmits signalling corresponding to a RRC Connection Resume Request to the selected base station. Because the terminal device may have undergone a cell reselection while in the RRC suspend mode (e.g. due to mobility), it may seek to resume connection with a base station which is different from the base station to which the terminal device was previously connected (i.e. the base station storing the terminal device context information). That is to say, the base station to which the terminal device is seeking to connect might not itself have a record of the relevant context information for the terminal device. Accordingly, it has been proposed for a terminal device requesting resumption of an RRC connection to provide an indication of the base station storing its context information (i.e. the base station to which the terminal device was connected before its RRC connection was suspended). In particular, it has been proposed that a terminal device seeking to re-establish connection to the network via a selected base station should convey an indication of what is referred to as a Resume ID. The Resume ID includes an indication of both the identity of the terminal device and the identity of the base station storing the terminal device's context information.

Hence, when an RRC connection is suspended, the terminal device or UE stores a Resume ID and then transitions into what is otherwise an RRC idle state. Upon indication from the lower protocol layers that the RRC connection has been suspended, the network enters EMM (evolved packet system mobility management) idle mode with suspend indication, but does not consider the NAS signalling connection released. Then, in a message to resume, the UE provides the Resume ID to be used by a selected eNB to access the stored information required to resume the RRC connection. When the RRC connection is resumed, RRC configures the UE according to the RRC connection resume procedure based on the stored UE context and any RRC configuration received from the network. The RRC connection resume procedure re-activates security and re-establishes the usual connection radio bearers. Upon indication from the lower layers that the RRC connection has been resumed when in EMM idle mode with suspend indication, the network enters EMM connected mode.

Since the suspend/resume procedure re-establishes radio bearers and continues security, the overhead of performing a full RRC Connection establishment procedure (from idle mode to connected mode) may be avoided. Thereby, the RRC signalling overhead when moving between RRC idle and RRC connected modes is reduced.

An RRC connected mode requires the exchange of a large amount of signals, such as the monitoring of control channels such as MPDCCH and NPDCCH. Accordingly, RRC connected mode operation can consume significantly more power than operation in an RRC idle mode or an RRC suspended mode. Consequently, in the context of the present disclosure, RRC idle and RRC suspended modes can be thought of as energy saving modes or low energy modes, as compared to an RRC connected mode, which is a high energy mode. Also, a mode using Discontinuous Reception (DRX) in which a long cycle time is employed can also be used as an energy saving mode, since most of the time the UE is asleep, and wakes up only periodically in time with the DRX cycle.

Within a network, it is often desirable or necessary to determine the position or location of a particular UE. One positioning technique, which is for example considered useful in the context of the Internet of Things, is Observed Time Difference Of Arrival (OTDOA), in which a UE is signalled to perform positioning and in response the UE determines a Reference Signal Time Difference (RSTD). This is the time difference observed by the UE between the arrival of a signal from a target eNB and the arrival of a signal from a reference eNB. The UE measures RSTD for two or more eNBs, which involves signals from three or more eNBs since one of them is the reference eNB. The UE then sends these measurements to a location server, for example residing in the core network. The location server calculates the UE's position based on these RSTD measurements using the known location of the eNBs involved. That is, the location server performs a triangulation (involving at least three eNBs) to determine the UE location.

Figure 2:
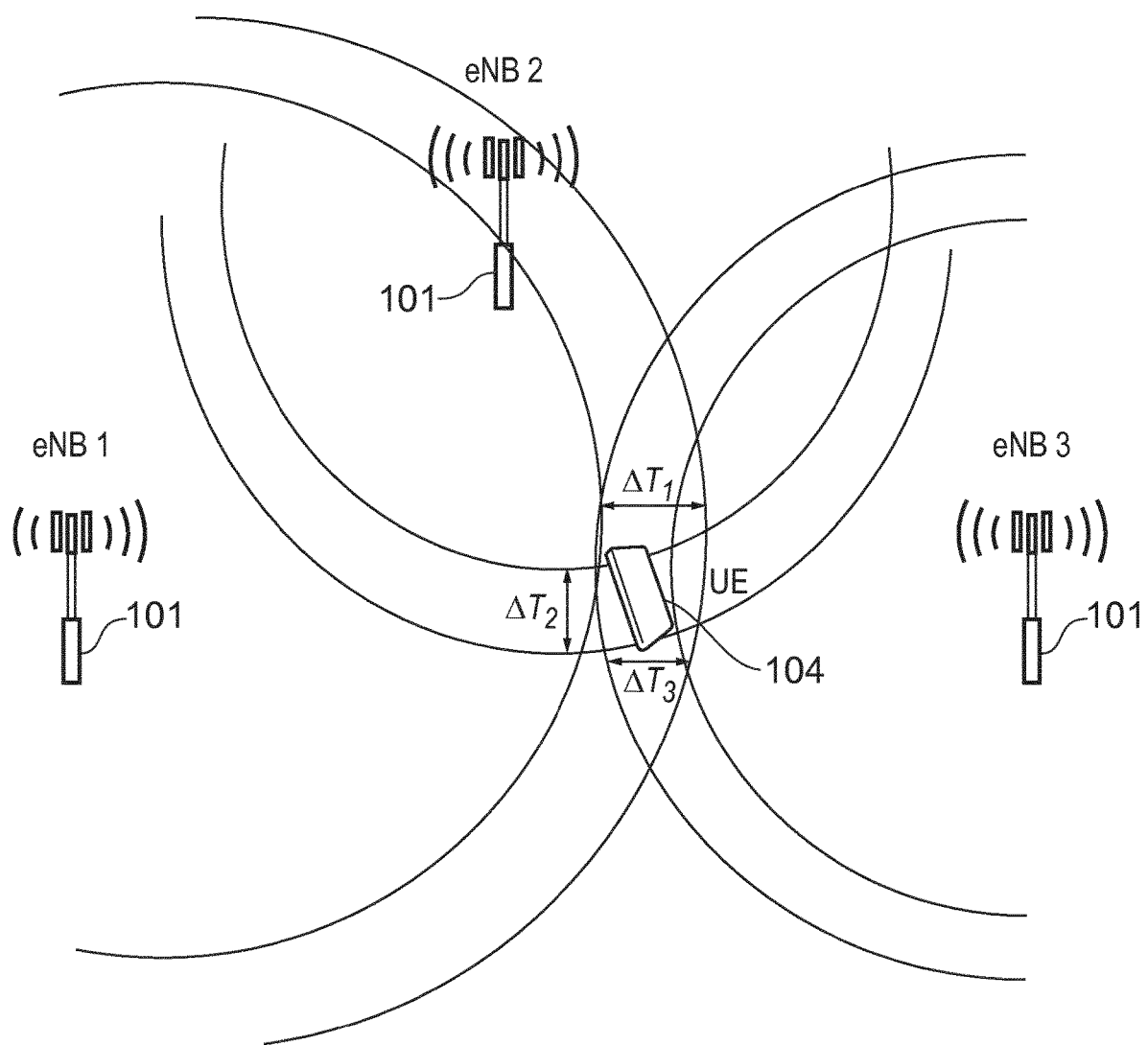
FIG. 2 shows a schematic representation of base stations and user equipment participating in an example method of determining the position of the user equipment.

FIG. 2 shows a schematic representation of this procedure. A UE 104 receives a signal from each of three eNBs 101, one of which is designated as the reference eNB, and notes the time at which each signal arrives. Then, the difference in arrival time for the signal from each eNB compared to the arrival time from the reference eNB is determined; this is the RSTD. In the subsequent triangulation, the accuracy of the position calculated for the UE is dependent upon the accuracy of the measured RSTD, which is turn depends on the accuracy of the measured arrival times. For example, in the FIG. 2 scenario the time of arrival from eNB1 has an accuracy of $\Delta T_1$ (being the error between the earliest and latest possible arrival times), the time of arrival from eNB2 has an accuracy of $\Delta T_2$, and the time of arrival from eNB3 has an accuracy of $\Delta T_3$. This accuracy of the time of arrival measurement depends on the quality of the measured signal (a reference signal) and the bandwidth of that reference signal.

Figure 3:
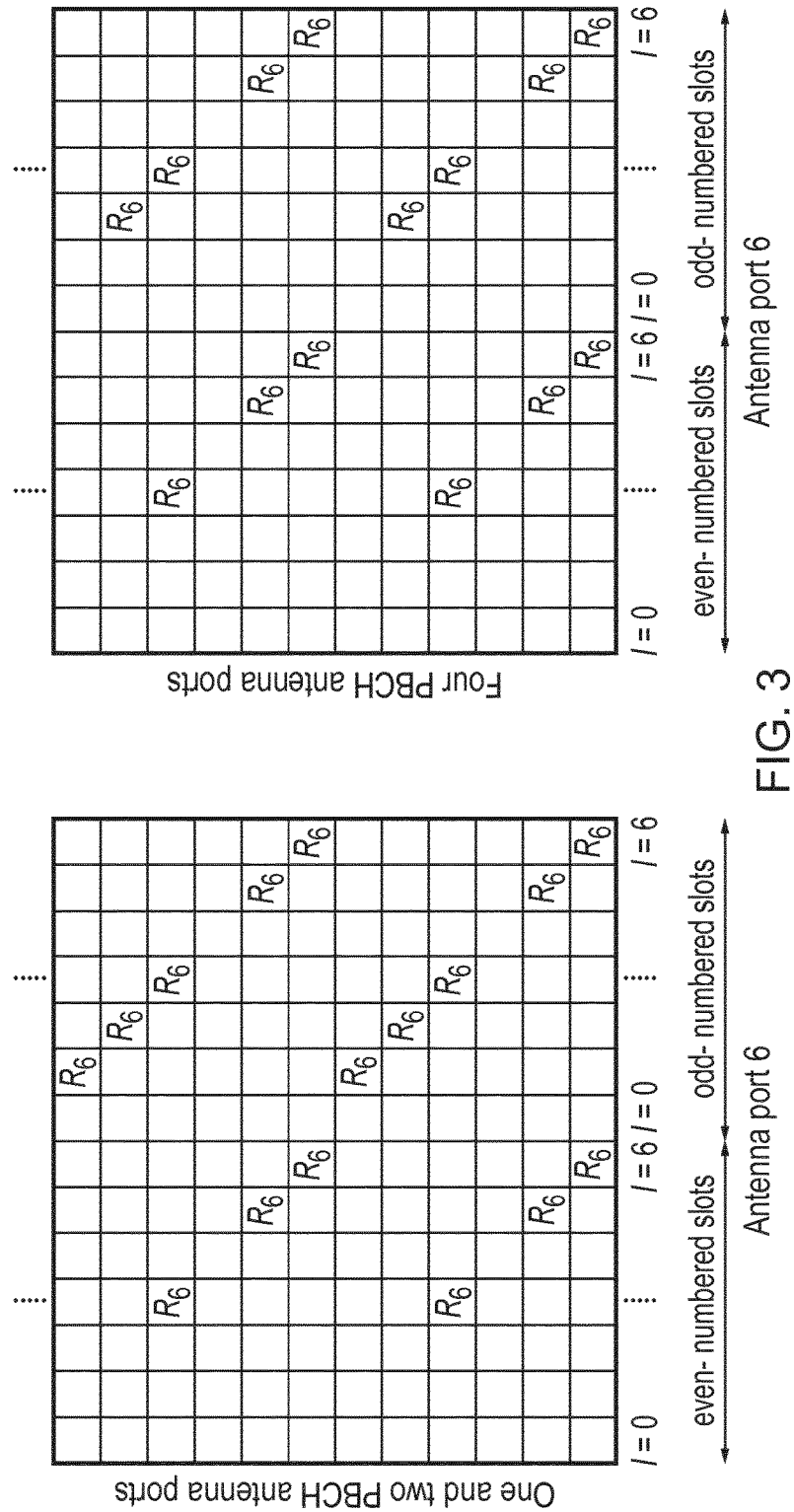
FIG. 3 shows example resource element locations for signals sent by a base station such as that in FIG. 2.

The arrival times at the UE can be estimated using an existing signal, for example reference signals such as CRS (cell-specific reference signal), PSS (primary synchronisation signal) or SSS (secondary synchronisation signal). However, these reference signals can experience inter-cell interferences. To address this, dedicated Positioning Reference Signals (PRS) have been introduced, to be transmitted from eNBs for use in OTDOA. FIG. 3 shows examples of resource element locations of a set of PRS for an eNB; the location occupied is dependent upon the eNB's Cell ID. Up to six different sets of PRS locations with different frequency shifts can be transmitted, hence up to six different eNBs can be measured at a time assuming one eNB per frequency shift (note however that eNBs sharing the same frequency shift would have different sequences to distinguish among themselves). The PRS is transmitted over $N_{PRS}=\{1, 2, 4, 6\}$ consecutive subframes with a period of $T_{PRS}=\{160, 320, 640, 1280\}$ subframes. The $N_{PRS}$ consecutive subframes of PRS transmission are known as a Positioning Occasion.

Figure 4:
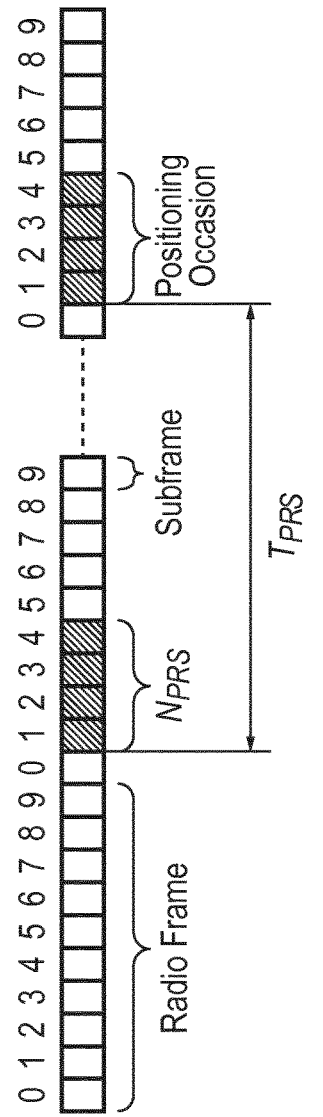
FIG. 4 shows a schematic representation of example radio frames incorporating positioning signals sent by base stations such as those in FIG. 2.

FIG. 4 shows an example of a sequence of transmitted radio frames incorporating PRS. Each radio frame is made up of ten subframes (0 to 9). Within a frame the Positioning Occasion, indicated as the darker subframes, has length $N_{PRS}=4$ subframes, and occupies subframes 1, 2, 3 & 4. The Positioning Occasion does not occur in every radio frame, but is repeated with a period $T_{PRS}$.

In summary, an OTDOA procedure starts with a network component such as a location server (the network serving mobile location centre (eSMLC)) requesting through the LPP layer (a LTE positioning protocol layer) an OTDOA measurement, requiring a set of RSTD measurements from a UE. Together with this request the UE receives assistance data (configuration data, information or parameters) to enable it to obtain the RSTD measurements. The assistance data includes a list of cells (eNBs) with their PRS parameters, including bandwidth, periodicity and the like. The UE then proceeds to perform these measurements, by estimating the exact time offsets between the PRS from different eNBs, during a given period of time, which may typically be up to eight or 16 periods of the PRS signals. The UE then reports to the location server these estimated time differences together with an estimate of the measurement quality. The eSMLC then uses the measurements together with its knowledge of the eNBs (positions and PRS transmit time offsets) to estimate the position of the UE. (In the context of LTE, details of the LPP can be found in the 36.355 specification, details of PRS signals can be found in section 6.10.4 of the 36.211 specification, and an example OTDOA procedure appears in section 9 of the 37.571-1 specification.)

An important feature of any UE is its battery life; for a long battery life the device needs to be energy efficient. In LTE, OTDOA as described above is performed when the UE is in RRC connected mode since a connection is required between the location server and the UE. However, a UE in RRC connected mode consumes significantly more power than one in RRC idle mode, because in RRC connected operation the UE has to monitor for downlink transmission on the MPDCCH/NPDCCH control channels. Consequently, significant energy may be required to perform OTDOA.

A further positioning technique is Uplink Time Difference Of Arrival (UTDOA). In this method, a UE transmits an uplink pilot signal such as a SRS (Sounding Reference Signal) that is received by multiple eNBs.

Figure 5:
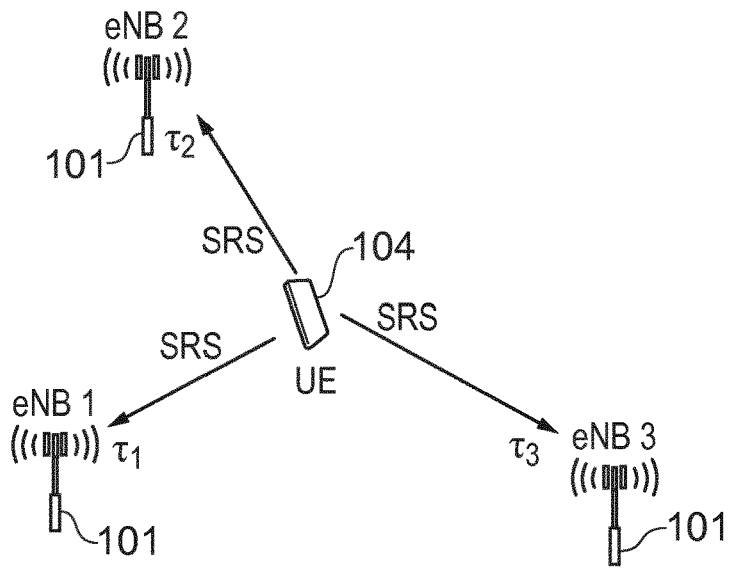
FIG. 5 shows a schematic representation of base stations and user equipment participating in a further example method of determining the position of the user equipment.

FIG. 5 shows a schematic representation of an example UTDOA procedure. Part of a network comprising a UE 104 and three eNBs 101 is shown. A location server initiates the procedure by requesting a position measurement for the UE 104. In response, an SRS (uplink pilot signal) is transmitted from the UE, and arrives at each of the eNBs at different times. In the illustrated example, eNB1, eNB2 and eNB3 receive the SRS at times $\tau_1$, $\tau_2$ and $\tau_3$ respectively. The eNBs 101 each determine their own time of arrival of the SRS, and send these timings to a location server. The location server uses these measured timings to calculate the UE location based on triangulation.

Transmission of SRS by a UE is configured by an eNB in RRC connected mode, where typically in this mode, large data transfer is expected. However, in some contexts, such as MTC devices in the IoT, UEs are not expected to perform large data transfer but rather to transfer small amounts of data infrequently. In such a situation, maintaining a UE in a connected mode that is otherwise not needed solely for the purpose of positioning, would consume UE battery life due to the high power consumption in RRC connected mode (from monitoring of control channels such as M-PDCCH and NPDCCH). On the other hand, for a UE in idle mode to start an RRC connection to be able to carry out UTDOA requires a large amount of signalling; this is considered inefficient if the RCC connected mode is to be used only to transmit the required SRS. Consequently, the existing method of UTDOA may not be considered suitable for all UEs, for example MTC devices.

Hence, both the conventional OTDOA and UTDOA positioning methods tend to require undesirably large levels of power consumption, reducing the battery life of UEs. Accordingly, it is proposed to carry out device positioning and the measurements required therefor using an energy-saving or low energy connection mode, in place of the conventional RRC connected mode. For example, the UE may be in a RRC idle mode or a RRC suspended mode during the measurement procedure. As discussed above, OTDOA uses PRS signals sent from the eNBs and received by the UE, whereas UTDOA uses SRS or other pilot uplink signals sent from the UE and received by the eNBs. For convenience herein, these signals may collectively be termed "positioning signals", and the time period during which these positioning signals are sent and received, which is when the UE is participating in a measurement phase of the positioning method, is performed by the UE in an energy-saving mode. This phase may also be considered as a transmission phase, during which the positioning signals are transmitted between the UE and the eNB (in either direction, depending on the method). Various configurations are envisaged for the OTDOA and UTDOA alternatives. Firstly, we consider OTDOA in detail.

In OTDOA embodiments, the UE performs the RSTD measurements (recall that this is the measurement of arrival time differences for PRS transmissions from multiple eNBs) in an energy saving mode, such as RRC idle or RRC suspended. For example, the UE operates a discontinuous receive (DRX) arrangement, checking for paging messages once every DRX cycle, and the DRX cycle period can be long. Once the RSTD measurements are completed, the UE moves to RRC connected mode so as to be able to transmit a report of the positioning (RSTD) measurements to the location server. This example recognises that the positioning occasion (PRS) period $T_{PRS}$ is long, while UE traffic may be infrequent (for example if the UE is an MTC) and consist of small packets only. Hence the UE does not need to be connected for long periods of time (since the activity that requires connection is short and infrequent), and the UE is inactive most of the time when obtaining the PRS measurements. In effect, use of an energy saving radio resource mode for OTDOA enables the UE to sleep (that is, use of DRX) when obtaining the PRS measurements. It is also recognised that OTDOA requires only downlink activity (transmission from eNB to UE), with uplink activities (such as timing advance and power control) being unnecessary for an accurate measurement of the PRS and calculation of the RSTD. As an example, positioning according to such a method would be useful for network-triggered aperiodic positioning reports, such as a dog owner requesting the location of his dog to which a UE is attached; this request would trigger a positioning report from the UE. Equally, however, the method is applicable to periodic positioning reporting if the time period between reports is large (for example of the order of a couple of seconds).

In some embodiments, the energy saving mode for OTDOA may be RRC suspended mode, as described above.

A potential development for LTE is to allow a UE to be suspended while the network uses an "anchor eNB" which is the last eNB to which the UE was connected before being suspended. This allows the core network to remain in EMM connected mode while the RAN is in idle mode, so that from a core network perspective the UE is still connected to the anchor eNB. Paging is performed within the RAN in order to make the RRC state transition to idle mode transparent to the core network. If the UE has moved to another cell, the RAN takes care of locating the UE via paging and transferring the UE context to the new eNB. Importantly, this would enable the UE power saving state in RAN to be transparent to the core network and the LPP server (location protocol), avoiding impact to LPP signalling procedures if positioning measurements are performed in the suspended state.

The UE should be provided with necessary information to enable it to carry out the required functions for a positioning method, in particular the sending or receiving of positioning signals. For OTDOA this includes measurement of the incoming positioning signals, calculation of the RSTD and report of the RSTD values to the network. For UTDOA, the functions include transmission of outgoing positioning signals. Providing the UE with the required information and parameters can be considered as configuration of the UE.

The UE can be configured for positioning measurement and reporting while it is connected to the network. The UE can then move into the suspended mode, when it may perform PRS measurements. It should be appreciated that the UE is not required to move immediately to suspended mode once it has been configured for positioning measurements; rather the UE can perform user data transfer in connected mode prior to moving to the suspended mode. The UE can also perform PRS measurement in the connected mode as per conventional OTDOA if the data transfer period overlaps a Positioning Occasion.

Figure 6:
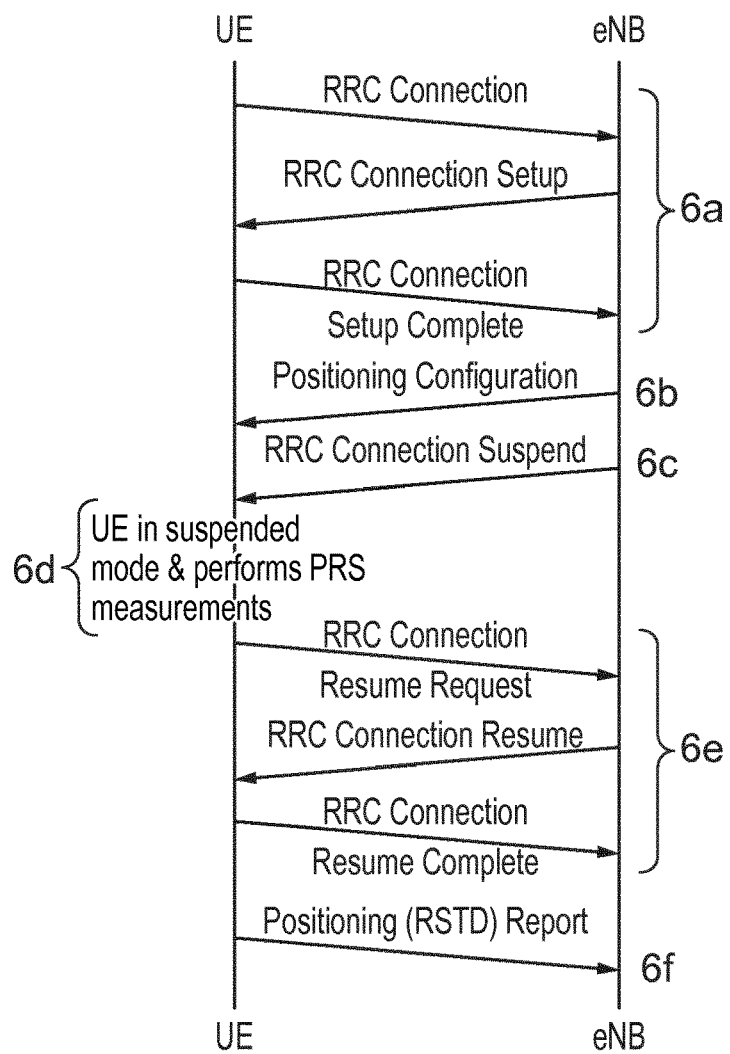
FIG. 6 shows a signalling diagram of steps in an example method for determining the position of a user equipment.

FIG. 6 shows a schematic representation of steps in an example implementation, in the form of a signalling diagram. In a first stage 6a, the UE establishes a RRC connection with an eNB in the network. This follows the usual steps of a RRC connection request sent from the UE to the eNB, RRC connection setup information signalling being sent from the eNB to the UE in reply to the request, and an acknowledgement that the RRC connection setup is complete sent from the UE back the eNB. Once connected, if OTDOA is required, the eNB configures the positioning parameters required by the UE for RSTD measurements, and sends them to the UE so that the UE is configured for positioning measurement and reporting (step 6b). The parameters may include the $N_{PRS}$ and $T_{PRS}$ parameters and notification of neighbouring eNBs. The UE may then also use its connected state to perform user data exchange but in this example, the eNB sends the UE directly into the suspended mode, in step 6c. The UE stores the Resume ID, and the eNB retains the UE context. In the suspended mode, the UE wakes up during Positioning Occasions to perform PRS measurements (step 6d). Once the UE has obtained the required RSTD, it is necessary for the RRC connection to be resumed. Thus, in stage 6e, the UE requests for its RRC connection to be resumed, including providing the Resume ID to the eNB. The eNB resumes the RRC connection with the UE, either by directly using the stored UE context or by transferring the UE context to another eNB into whose cell the UE has moved while suspended. The UE acknowledges to the eNB that the RRC connection resume is complete. Then, in step 6f, the UE uses the RRC connection to submit the RSTD measurements to the network, by sending a positioning report to the eNB. It should be appreciated that this is one example of signalling to achieve OTDOA in an energy saving mode, and other signalling, for example including providing positioning configuration to the UE at the RRC Connection Setup Complete message, is possible. In embodiments such as the FIG. 6 example, the use of a suspended mode for performing the PRS measurements is useful in that the RRC connection required for the UE to transmit the positioning report can be implemented more readily (with lower signalling overhead) than if the UE is in a full RRC idle mode.

Various options are contemplated for configuring the UE to obtain RSTD measurements and initiating the measurement process. In an embodiment, the positioning configuration may instead be broadcast in the system information. A UE can receive system information in the form of Master Information Blocks (MIB) and/or System Information Blocks (SIB) while in RRC idle mode (or RRC suspended mode), for the purpose of obtaining parameters necessary for functions including cell selection, paging message detection and network access, and the OTDOA configuration information can be included also. This option saves the requirement for the UE to be in RRC connected mode for positioning configuration. Additional configuration, if required, can then be configured at a time when the UE is RRC connected. An indication can be signalled to the UE to start the PRS measuring process. Such an indication can be signalled in a RRC message.

In another embodiment, a UE that has been preconfigured with positioning configurations (for example, via the SIB or when it was RRC connected), is indicated when it is in idle mode to start the PRS measurement. This indication can be done via paging where the said indication can be included in the DownLink Control Information (DCI), or in a paging message. For indication in a paging message, the UE can search for its ID in the paging message. Once the indication is made, the UE can perform a RRC Connection to setup the security and obtain further PRS configuration such as assistance information to help the UE in PRS measurement, and then move to suspended mode to perform the PRS measurement as described above. For a UE with prior configuration which is still valid, the DCI or paging message can directly instruct the UE to perform PRS measurements without performing an RRC connection. Alternatively, if the UE is not preconfigured in any way, all the positioning configuration parameters may be provided to the UE once it enters RRC connection mode in response to the positioning indication.

In another embodiment, a UE in suspended mode may be paged to perform PRS measurements. The paging message may contain positioning configurations, so the UE need not be preconfigured. Also, if the paging message contains all positioning configurations, the UE does not need to resume its RRC connection for further or updated configuration, and can proceed directly to PRS measurement. However, if the paging message includes only partial positioning configurations, the UE can enter RRC connected mode to obtain further configuration as above.

In another embodiment, a UE that has been preconfigured with positioning configurations is notified while in RRC connected mode to start PRS measurements. This may be via a DCI carried by an NPDCCH or MPDCCH, for example. The UE can then release its connection and move to suspended mode to perform the PRS measurements.

After the PRS measurements have been made and the RSTD values obtained, the UE needs to report the results to the network for the positioning triangulation calculation. Triggering of the reporting may be achieved in a variety of ways. For example, the UE may stop obtaining PRS measurements and resume its RRC connection to submit its positioning report when it has obtained a predefined number of RSTD measurements. This predefined number might be notified to the UE as a parameter in the positioning configuration, for example, or may be a function of the number of eNBs to be included in the PRS measurements which the UE determines when the OTDOA is initiated.

In another example, the UE may stop obtaining PRS measurements and resume its RRC connection to submit its positioning report after a predefined period of time. This predefined period of time may be configured by the network as part of the positioning configuration provided to the UE, for example.

In a further example, the UE may stop obtaining the PRS measurements and resume its RRC connection to submit its positioning report when it is paged by the network. In other words, the UE will continue to perform PRS measurements until it is paged to submit the positioning report. These are merely examples of how the measurement phase of the OTDOA procedure may be concluding; other techniques are not excluded.

In other embodiments, the energy saving mode for OTDOA may be RRC idle mode, as described above, rather than RRC suspended mode. This may be implemented in various ways, depending on the mode of the UE at the time when OTDOA is required. If the UE is in RRC connected mode at this time, the RRC connection can be utilised to configure the UE, in that the PRS configuration is performed using unicast RRC messages. Alternatively configuration may be via the SIB. An indication to start the PRS measurements can be signalled in a RRC message, or in DCI. Once configured and notified to commence the OTDOA process, the UE can then move to the idle mode to perform the PRS measurements. For example, this may be done after a predefined period of time from the last user data transfer (over the RRC connection) or immediately after receipt of the starting indication (notification).

If, on the other hand, the UE is in RRC idle mode when OTDOA is required, other options may be implemented. For example, the UE can establish an RRC connection to the eNB and move to connected mode to obtain the PRS positioning configuration. The UE can then be indicated to start PRS measurements, which prompts it to move back to RRC idle mode to perform the measurements. Alternatively, with the UE in idle mode, and if it has not been preconfigured during an earlier RRC connection mode, the positioning configuration can be performed using a paging message (which may include the UE ID), or indicated in the SIB. Once configured in any of these ways, the UE is then prompted to start PRS measurements using a paging message or a DCI. Once configured and prompted by an indication to perform OTDOA, the UE moves to idle mode to carry out the PRS measurements.

In any of these cases, the PRS measurement may be halted according to any of the previously described embodiments for triggering positioning reporting. Then, again as before, the UE performs RRC connection to submit its positioning report to the network. The RRC connection provides security to send the positioning report.

In a further alternative, the said energy saving mode for OTDOA may be an RRC connected mode operating with a long Discontinuous Reception (DRX) cycle period. At the end of the PRS measurement time, the UE moves out of this long DRX to submit the positioning report using the RRC connection. Discontinuous Reception is a communication method intended to conserve device battery life by having the UE operate to check for paging messages only at specified phases (the DRX cycle), between which the UE switches off its receiver and enters a low power state. A default DRX cycle is broadcast in a System Information Block, but an individual UE may propose its own DRX cycle length. A long cycle time may be 256 radio frames, corresponding to 2560 ms. Note that DRX can be used in connected and idle modes.

Figure 7:
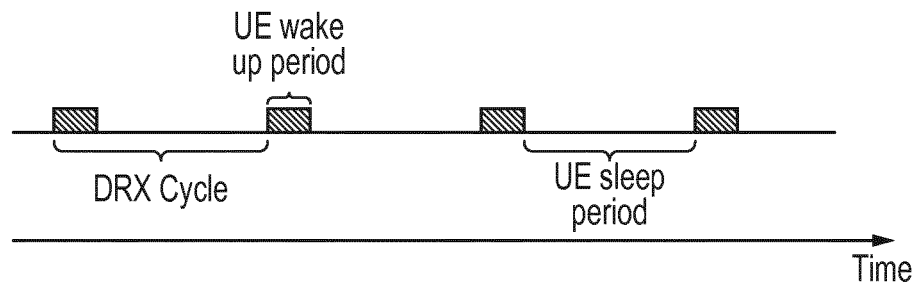
FIG. 7 shows a time line of an example of discontinuous reception operation of a user equipment.

In this embodiment, the UE is put into a long DRX in which the UE wakes up periodically to monitor for possible paging or grant. FIG. 7 illustrates this arrangement on a time line. The DRX cycle comprises periods of UE sleep (low power) interspersed with periods of UE wake-up activity (higher power). The DRX cycle time or period is the length of time from the start of one wake-up period to the next. The wake-up periods are Paging Occasions, and all have the same duration (note that different UEs may have wake-up periods of different duration, however), as do the sleep periods, with the wake-up period duration being significantly shorter than the sleep period. One sleep period plus one wake up period defines the DRX cycle time. Typically, the start time for a UE wake-up period will be dependent upon the UE ID, and hence the UEs in a cell wake up at different times; this allows the eNB to spread the traffic load more uniformly over time.

However, the Positioning Occasion of the PRS used for OTDOA (see FIG. 4) is broadcast at a fixed time that is independent of any UE ID. Using standard DRX, the UE may be asleep during a Positioning Occasion if this does not coincide with a DRX wake-up period. Recognising this, in an embodiment an additional DRX mode is proposed, designated as Positioning DRX or P-DRX, and introduced in the said energy saving mode.

Figure 8:
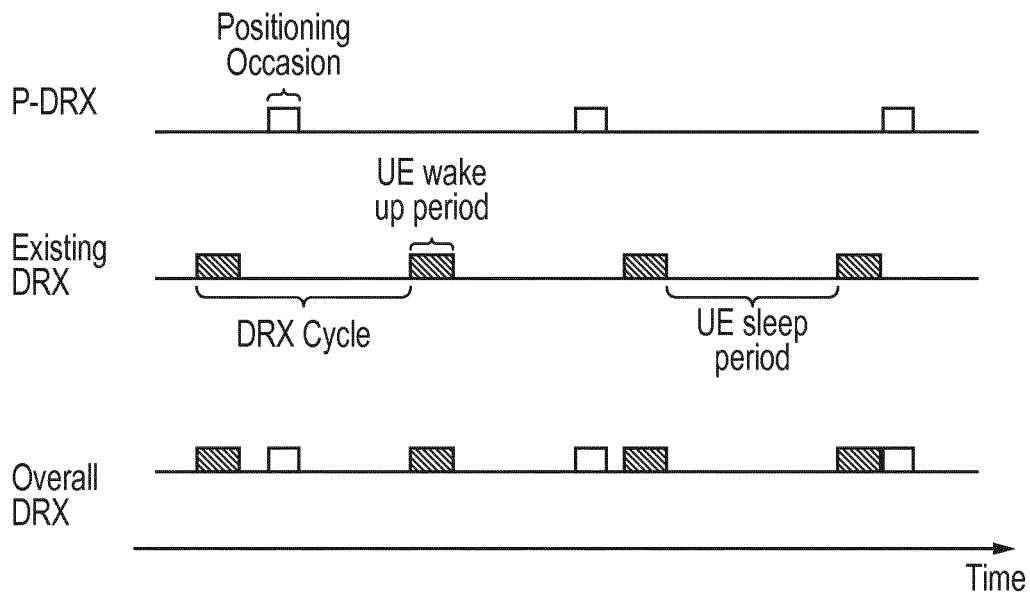
FIG. 8 shows a time line of an example of modified discontinuous reception operation of a user equipment.

FIG. 8 shows a time line of this modified DRX arrangement. The P-DRX is arranged so as to provide a UE wake-up period that coincides or overlaps with each PRX Positioning Occasion. Time line (a) shows this, with periodic wake-up periods (depicted as light shaded blocks) happening at the same time as the PRS is broadcast in its Positioning Occasions. Hence the P-DRX are separated by the $T_{PRS}$ cycle time. Under P-DRX, the UE wakes up during Positioning Occasions to measure the PRS and sleeps in between Positioning Occasions. Time line (b) shows the existing DRX cycle previously shown in FIG. 7, in which the UE wakes up to check for paging messages during Paging Occasions (darker shaded blocks). Hence two DRX patterns for the UE are created, one being the energy saving mode existing DRX (e.g. Paging Occasion), and another the P-DRX. The resultant overall combined DRX pattern is shown in time line (c), and is the superposition of the existing DRX and P-DRX. The UE wakes up based on the two criteria of PRS and paging to perform one of two different tasks according to the current wake-up period, that is, to monitor for paging in a DRX wake-up period and to measure PRS in a P-DRX wake up period. Note that the cycle period for DRX and P-DRX may be different and the start times for the two sets of wake-up periods are unrelated, so the duration of sleep periods is no longer constant. The addition of the P-DRX produces a modified DRX for use in a positioning method.

Figure 9:
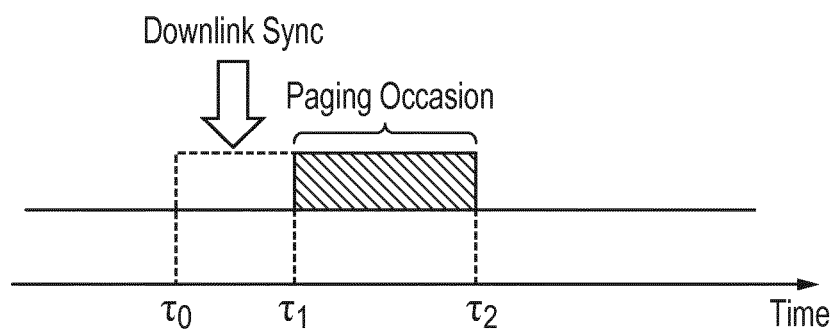
FIG. 9 shows a time line of an example paging occasion during discontinuous reception operation of a user equipment.

In a long DRX, due to the absence of any receiving downlink signal, the UE may lose time and frequency synchronisation with the eNB due to clock drift. To address this, a UE may wake up prior to its actual DRX wake-up time to synchronise to the network before it monitors for downlink during the actual DRX wake up period. For example, FIG. 9 shows a time line of a DRX Paging Occasion of a UE, where the Paging Occasion starts at time $\tau_1$ and ends at time $\tau_2$. If the sleep period is long the UE may need to wake up prior to its Paging Occasion, at earlier time $\tau_0$, so as to have a "downlink sync" period between $\tau_0$ and $\tau_1$ in which to synchronise in the downlink in order to be ready and able to monitor for possible paging indications between times $\tau_1$ and $\tau_2$. Performing downlink synchronisation consumes additional energy, however. Recognising this, in another embodiment, it is proposed that the UE's DRX cycle may be shifted such that its wake-up time for a Paging Occasion is adjacent or close to that of the Positioning Occasion so that the UE still maintains synchronisation when monitoring for paging and measuring PRS.

Figure 10:
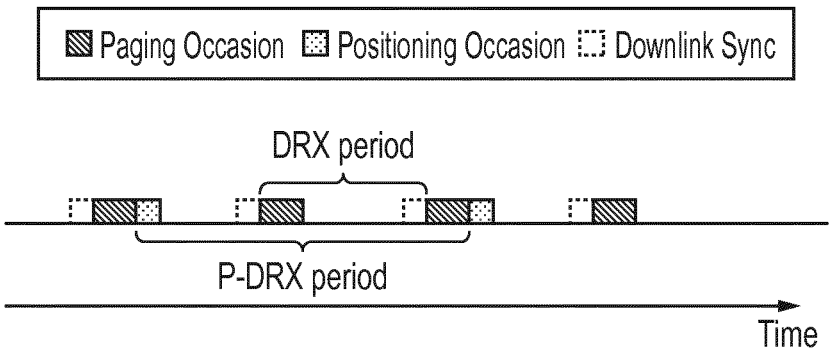
FIG. 10 shows a time line of a further example of modified discontinuous reception operation of a user equipment.

FIG. 10 shows a time line illustrating this arrangement over several combined DRX cycles. In this example, the DRX cycle comprising the Paging Occasions (in idle or suspended mode), which is based on the UE ID, is shifted in time so that the Paging Occasions occur immediately before the Positioning Occasions (the PRS broadcast times are fixed so the P-DRX cycle cannot be shifted). A Paging Occasion end time coincides with a Positioning Occasion start time to give a longer combined wake-up period comprising a Paging Occasion plus a Positioning Occasion, plus a downlink sync period before each Paging Occasion. Hence, the number of downlink sync decodes required is reduced since the UE needs only a single downlink sync in order to both monitor in its Paging Occasion and measure PRS in the Positioning Occasion, rather than a downlink sync for each Paging Occasion and another down link sync for each Positioning Occasion. In this FIG. 10 example, the P-DRX signal is broadcast less frequently than the paging messages, so that the DRX cycle period is half the length of the P-DRX cycle period. Hence, only every other Paging Occasion has a Positioning Occasion attached to it. Other multiples may be used; in general the P-DRX cycle period (or repetition rate) is n times the DRX cycle period (or repetition rate), where n may be 1, 2, 3 or larger integers. Note also that a Positioning Occasion may occur before a Paging Occasion, rather than afterwards as in FIG. 10. Also, the Positioning Occasion and the Paging Occasion need not be immediately adjacent in time, and may instead be spaced apart but close enough that the two Occasions take place while the UE is still synchronised following a single downlink sync period.

This shift in the Paging Occasion cycle is only required when the UE is measuring PRS, in other words in response to receipt by the UE of an indication to carry out OTDOA, and the Paging Occasion can revert back to its original DRX pattern once the PRS measurement is completed.

We now consider UTDOA in detail. Recall that in this positioning method, the UE transmits positioning signals (uplink pilot such as SRS) which are received by a number of eNBs. Conventionally, the UE is in RRC connected mode to transmit the positioning signals, but according to embodiments, the UE instead transmits in an energy saving (non-RRC connected) mode.

This use of an energy saving mode avoids the need for the UE to perform an RRC connection procedure to be able to participate in a UTDOA procedure (which requires high signalling overhead), and also avoids the need for the UE to monitor for MPDCCH or NPDCCH which uses up battery power due to the need to continually monitor the radio channel and to perform multiple blind decodes. UTDOA requires the transmission of uplink pilot signals by the UE, and according to embodiments, such transmission can be performed in a non-RRC connected mode. In place of RRC connected mode, in some examples the UE can instead be paged by one or more eNBs using a "Positioning Paging" message when it is in idle mode or suspended mode. The UE responds to this positioning paging message by transmitting the uplink pilot directly without transiting to RRC connected mode. The Positioning Paging message can both indicate to the UE that a UTDOA procedure is required, and notify the UE of the parameters and details of the uplink pilot to be transmitted. This configures the UE for UTDOA, similar to the configuration of a UE for OTDOA described above.

Details of the required uplink pilot, such as its sequence, can be determined by:

The core network such as the location server; or by
a selected eNB, which signals the information to a group of eNBs that are participating in the transmission of the said Positioning Paging message; or by
a selected eNB, which signals to the location server, which in turn then signals this information to the group of eNBs that are participating in the transmission of the said Positioning Paging message.

In an embodiment, the Positioning Paging message is a paging message. This paging message may contain a list of UE IDs and can further include indication(s) of the uplink resources for those UEs to transmit their uplink pilots. Each UE is assigned a different resource (time, frequency, code). Here the paging message is carried by the PDSCH and is scheduled by a DCI carried by an MPDCCH or NPDCCH.

In another embodiment, the Positioning Paging message is a new DCI carried by a MPDCCH or NPDCCH during the UE Paging Occasion. The DCI acts as an uplink grant containing uplink resources for transmission of an uplink pilot.

In an embodiment, the uplink pilot is a preamble sequence, or "Positioning Preamble". This takes advantage of the fact that a preamble transmission does not need to be timing advanced to arrive at an eNB within the uplink subframe, but rather it can be received using a simple correlator. Transmission of the positioning signal is thereby simplified. The preamble sequence can be indicated in the positioning paging process, for example in a paging message or DCI as noted above. The preamble may come from a set of preambles that is different from those used for PRACH. This allows the eNBs to uniquely identify the UE. The positioning preamble may be unique within an area of multiple eNBs, such as within a tracking area, or a RAN routing area.

A benefit of using a Positioning Paging message is that the network does not need to know the UE location at the cell level (which it will not when the UE is in idle mode or suspended mode). Thus UTDOA can be indicated to the UE while it remains in an energy saving mode. The eNBs that page this UE can listen for the unique preamble and calculate the time of arrival. Subsequent Positioning Paging can be sent by a particular eNB, for example reselected by the UE or by a set of eNBs closest to the UE since the network is aware of the UE's location once an initial location operation has been completed.

In another embodiment, the UTDOA parameters such as the resources (time & frequency) used for the uplink pilot and the sequence used for the uplink pilot (such as a preamble) are configured when the UE is connected to the eNB by an RRC connection, rather than being communicated by the Positioning Paging. Since RRC connection undergoes security authentication, the UTDOA configuration of the UE is therefore secured which prevents unauthorised request for the UE's position or a rogue UE indicating a false location. The configuration can further provide encryption keys in deciphering the Positioning Paging message. This configuration can be valid within a Tracking Area.

Figure 11:
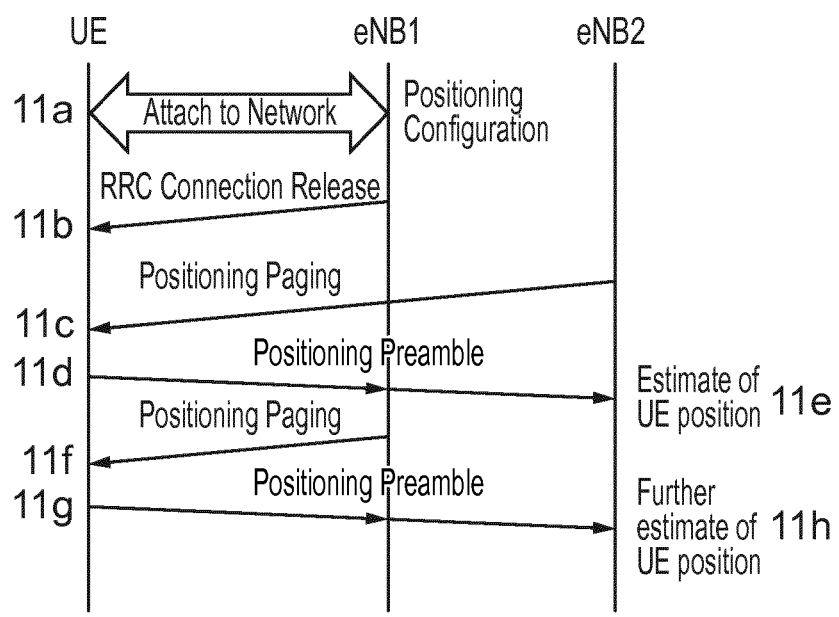
FIG. 11 shows a signalling diagram of steps in a further example method for determining the position of a user equipment.

FIG. 11 shows a signalling diagram of an example implementation of UTDOA. In this two eNBs (eNB1 and eNB2) are comprised in a Tracking Area. This is not limiting, however, and additional eNBs may participate in the UTDOA; in other words a Tracking Area may consist of more than two eNBs. The UE when turned on first attaches to the network in step 11a by establishing an RRC connection with eNB1, and is configured with one of the configurations being a positioning configuration which contains for example encryption keys used to decipher Positioning Paging messages and Positioning Preamble sequences. After configuration, the network releases the UE's RRC connection in step 11b, and the UE moves into idle mode or suspended mode. When a positioning request arises for this UE so the UE is required to perform UTDOA, in this example the network pages the UE using a Positioning Paging message, for example carried by a PDSCH (step 11c). This paging message contains a list of UEs required to transmit an uplink pilot (taking the form of Positioning Preambles in this example), in the event that positions of multiple UEs are required, and also contains one or more of the time, frequency and code resources for the transmissions. It may further contain the number of repetitions on the Positioning Preambles. Moving to step 11*d*, the UE transmits the Positioning Preamble, which is received by both eNB1 and eNB2, and the times of reception noted. After this first preamble transmission, the network calculates a first estimate of the UE's location, using triangulation based on the reception times at the various eNBs and their positions (step 11*e*). In this example, the UE is estimated to be within eNB1's coverage area (cell). If it is then deemed necessary or appropriate for the estimate of the location to be refined, the network can then signal another Positioning Paging message to the UE which is sent by eNB1 only (step 11*f*) since the UE is considered to be in the eNB1 cell, to request further preamble transmissions. In step 11*g* the UE responds by transmitting the Positioning Preamble again, which is received at the eNBs, and the arrival times used to refine the estimate of the UE position (step 11*h*).

The UE may be configured to continue to monitor for further Positioning Paging messages after it has received the first Positioning Paging message (which will occur in its Paging Occasion). This feature recognises that MTC devices, for example, may be configured with very long DRX (that is, long periods of time between consecutive Paging Occasions) and hence if the network requires further uplink pilots, it does not need to wait until the next Paging Occasion but can instead send this request after the first Positioning Paging message. In this arrangement, the UE should also stop monitoring for Positioning Paging messages and revert to its previous DRX cycle when the signal measurement phase is complete. This might be done by use of a timer which is started after the first Positioning Paging message is received; when the timer expires the UE stops monitoring for Positioning Paging messages. Alternatively, an indication may be transmitted to the UE to stop monitoring for further Positioning Paging messages. This indication can be transmitted in a paging message or via a DCI carried by MPDCCH or NPDCCH, for example.

In another embodiment, a Positioning Paging message may contain Timing Advance (TA) information for the UE. This may be used when the network has prior knowledge of the UE's approximate position. For example, the network may get a first estimate of the UE's position in response to the first Positioning Paging, and then subsequent Positioning Paging messages can contain TA information so that the UE can transmit its uplink pilot to arrive within a specified time window at the eNB. The eNB can determine the distance of the UE based on the sum of the timing advance and the arrival time of the uplink pilot within the time window. This can remove the need for a Positioning Preamble positioning signal.

A first Positioning Paging message may be transmitted to the UE using a different scheme to a second Positioning Paging message. For example, the first Positioning Paging message may be transmitted in the form of a paging message carried by a PDSCH that can contain detailed configuration information. Subsequent Positioning Paging messages may be transmitted using a DCI which contains less information (e.g. resources for uplink pilot, number of repetitions of uplink pilot, command to repeat transmission of a previous uplink pilot, change in the characteristics of the uplink pilot transmission relative to a previous uplink pilot transmission). In another embodiment, TA information carried by a subsequent Positioning Paging message is carried by a DCI.

In some embodiments, the uplink pilot may be a Sounding Reference Signal (SRS). The SRS can be transmitted when TA information is available, and when indicated by the network. So, in some examples the network can indicate to the UE the type of uplink pilot to be transmitted. This forms part of the configuration information. For example, the network can indicate a positioning preamble or a SRS.

Figure 12:
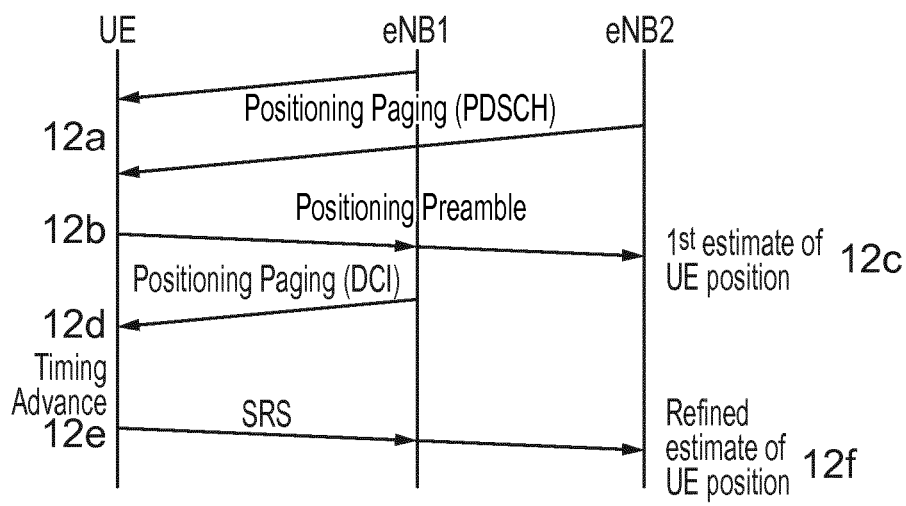
FIG. 12 shows a signalling diagram of steps in a still further example method for determining the position of a user equipment.

FIG. 12 shows a signalling diagram of an example procedure using different uplink pilots. Two eNBs, namely eNB1 and eNB2, are included, but note there can be more than two eNBs. Initially, the network does not know the location of the UE at cell level and hence transmits (from eNB1 and eNB2) a Positioning Paging message in the form of a paging message carried by PDSCH (step 12*a*). The UE responds at step 12*b* by transmitting a first positioning signal in the form of a Positioning Preamble in the scheduled frequency, time and code resource (as defined by configuration information included in the Positioning Paging message or alternatively in an earlier RRC connected configuration). The preamble transmission is received by both eNBs, and using the preamble receive times at the eNBs, the network determines a first estimate of the UE position in step 12*c*; here it is found to be located in eNB1's coverage. However, a further refined estimate of the position is required, so a further Positioning Paging message is transmitted from eNB1 in step 12*d*, this time in the form of a DCI (note this could also be in the form of a paging message). Additionally, TA information, which is estimated using the Positioning Preamble results, is included in the DCI. The UE uses the TA information to transmit a second positioning signal in the form of a SRS, with frequency hopping to cover a larger bandwidth (step 12*e*). The SRS is received at the eNBs, and the format of the signal provides the eNBs with improved granularity of the UE position in a second estimate (step 12*f*). Here it can be appreciated that the first uplink pilot using the preamble enables the network to determine the eNB closest to the UE and also the round trip time timing. A preamble typically occupies a small frequency bandwidth but a long period of time. The second uplink pilot using the SRS can occupy a larger frequency bandwidth but shorter time period to provide better accuracy. For UE devices such as MTC that have limited bandwidth, the SRS may be frequency-hopped to provide better accuracy.

In a further embodiment, following receipt of the positioning preamble by the eNBs, the network may determine a preferred timing advance value to be applied to a subsequent SRS transmission. The determination can either be performed by negotiation between a set of eNBs, or can be performed by a controlling network element, such as a location server. This feature is based on the observation that the best timing advance for the SRS for a group of eNBs may not be the same as the best timing advance for the cell closest to the UE.

Thus there has been described a method for use in a wireless telecommunications network, the mobile telecommunications network comprising a core network, two or more base stations each providing wireless connectivity within a base station cell, and a terminal device configured to communicate wirelessly with the base stations by a communication mode, the method being a positioning method for determining a position of the terminal device, and the method comprising sending one or more positioning signals between the base stations and the terminal device during a transmission phase of the method, and using measured arrival times of the positioning signals to triangulate a position of the terminal device, wherein during the transmission phase the terminal device is in an energy saving communication mode.

Although this disclosure describes techniques that are particularly appropriate for MTC and/or NB-IoT type devices, it will be understood that the techniques are generally applicable in the field of wireless communications.

Approaches in accordance with implementations of the disclosure can thus help to provide methods for determining the physical position/location of a terminal device within a mobile telecommunications network which use less power and hence assist in conserving device battery life.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1: A method for use in a wireless telecommunications network, the mobile telecommunications network comprising a core network, two or more base stations each providing wireless connectivity within a base station cell, and a terminal device configured to communicate wirelessly with the base stations by a communication mode, the method being a positioning method for determining a position of the terminal device, and the method comprising: sending one or more positioning signals between the base stations and the terminal device during a transmission phase of the method, and using measured arrival times of the positioning signals to triangulate a position of the terminal device, wherein during the transmission phase the terminal device is in an energy saving communication mode.

Paragraph 2. A method according to paragraph 1, in which the method is an observed time difference of arrival method comprising sending positioning signals from the base stations to arrive at the terminal device.

Paragraph 3. A method according to paragraph 2, in which the energy saving communication mode is an idle communication mode.

Paragraph 4. A method according to paragraph 2, in which the energy saving communication mode is a suspended communication mode.

Paragraph 5. A method according to any one of paragraphs 2 to 4, further comprising transitioning the terminal device to a connected communication mode when the transmission phase ends for the purpose of reporting time differences in the measured arrival times from the terminal device to elsewhere in the network.

Paragraph 6. A method according to paragraph 5, in which the transmission phase is ended after a predetermined number of arrival time measurements.

Paragraph 7. A method according to paragraph 5, in which the transmission phase is ended after a predetermined length of time.

Paragraph 8. A method according to paragraph 5, in which the transmission phase is ended by sending a paging message from one or more base stations to the terminal device to notify the terminal device to cease arrival time measurement.

Paragraph 9. A method according to any one of paragraphs 2 to 8, further comprising configuring the terminal device for operation in the transmission phase using a connected communication mode before the transmission phase, and transitioning the terminal device into the energy saving communication mode for the transmission phase.

Paragraph 10. A method according to any one of paragraphs 2 to 8, further comprising configuring the terminal device for operation in the transmission phase by broadcasting system information.

Paragraph 11. A method according to any one of paragraphs 2 to 8, further comprising configuring the terminal device for operation in the transmission phase while the terminal device is in an idle communication mode or in a suspended communication mode by sending a paging message to the terminal device.

Paragraph 12. A method according to paragraph 2, in which the energy saving communication mode comprises discontinuous reception operation of the terminal device in which the terminal device operates to receive paging messages during paging occasions, and operates additionally to receive positioning signals during positioning occasions during which the positioning signals are sent from the base stations.

Paragraph 13. A method according to paragraph 12, in which a cycle period of the discontinuous reception is shifted in time so that a start time of the positioning occasions or the paging occasions coincides with an end time of the paging occasions or the positioning occasions, or so that a paging occasion and a positioning occasion both occur while the terminal device maintains a synchronisation with the network achieved during a single downlink synchronisation procedure.

Paragraph 14. A method according to paragraph 13, in which positioning occasions have a cycle time which is n times a cycle time of the paging occasions, where n is an integer equal to 1 or more.

Paragraph 15. A method according to paragraph 1, in which the method is an uplink time difference of arrival method comprising sending positioning signals from the terminal device to arrive at the base stations.

Paragraph 16. A method according to paragraph 15, in which the energy saving communication mode is an idle communication mode.

Paragraph 17. A method according to claim 15, in which the energy saving communication mode is suspended communication mode.

Paragraph 18. A method according to any one of paragraphs 15 to 17, further comprising configuring the terminal device for operation in the transmission phase using a connected communication mode before the transmission phase, and transitioning the terminal device to the energy saving communication mode for the transmission phase.

Paragraph 19. A method according to any one of paragraphs 15 to 17, further comprising configuring the terminal device for operation in the transmission phase while the terminal device is in an idle communication mode or in a suspended communication mode by sending one or more paging messages to the terminal device.

Paragraph 20. A method according to paragraph 19, wherein configuring the terminal device includes configuring the terminal device to monitor for further paging messages during the transmission phase outside of paging occasions of the energy saving communication mode.

Paragraph 21. A method according to any one of paragraphs 15 to 20, in which the positioning signals comprise a preamble sequence according to configuration information sent to the terminal device during configuration of the terminal device for operation in the transmission phase.

Paragraph 22. A method according to any one of paragraphs 15 to 20, in which the positioning signals comprise one or more sounding reference signals.

Paragraph 23. A method according to paragraph 22, comprising communicating timing advance information to the terminal device for use in sending the sounding reference signals.

Paragraph 24. A method according to any one of paragraphs 15 to 20, comprising sending a first paging message to the terminal device to configure the terminal device to send a preamble sequence positioning signal in the transmission phase, followed by sending a second paging message to the terminal device to configure the terminal device to send a sounding reference signal positioning signal after the preamble sequence positioning signal.

Paragraph 25. A wireless telecommunications network comprising a core network, two or more base stations each providing wireless connectivity within a base station cell, and a terminal device configured to communicate wirelessly with the base stations by a communication mode, wherein the wireless telecommunications network is configured to carry out the method of any one of paragraphs 1 to 24.

Paragraph 26. A method of operating a terminal device in a wireless telecommunications network to determine a position of the terminal device, the network further comprising a core network and two or more base stations each providing wireless connectivity within a base station cell and the terminal device configured to communicate wirelessly with the base stations by a communication mode; wherein the method comprises a transmission phase during which positioning signals are sent from the base stations to arrive at the terminal device or sent from the terminal device to arrive at the base stations, measurements of arrival times of the positioning signals being obtained for use in triangulating a position of the terminal device, and the terminal device being in an energy saving communication mode during the transmission phase.

Paragraph 27. A terminal device for use in a wireless telecommunications network comprising the terminal device, a core network, and two or more base stations each providing wireless connectivity within a base station cell, wherein the terminal device comprises a controller unit and a transceiver unit and is configured to communicate wirelessly with the base stations by a communication mode, wherein the terminal device is further configured to: send one or more positioning signals to the base stations or receive positioning signals from the base stations during a transmission phase of a positioning method for determining a position of the terminal device by triangulation using measured arrival times of the positioning signals, the terminal device being in an energy saving communication mode during the transmission phase.

Paragraph 28. Integrated circuitry for a terminal device for use in a wireless telecommunications network comprising the terminal device, a core network, and two or more base stations each providing wireless connectivity within a base station cell, wherein the integrated circuitry comprises a controller element and a transceiver element configured to operate together to: enable the terminal device to communicate wirelessly with the base stations by a communication mode; and send one or more positioning signals from the terminal device to the base stations or receive positioning signals at the terminal device from the base stations during a transmission phase of a positioning method for determining a position of the terminal device by triangulation using measured arrival times of the positioning signals, the terminal device being in an energy saving communication mode during the transmission phase.

Paragraph 29. A method of operating a base station in a wireless telecommunications network to determine a position of a terminal device in the network, the network comprising a core network, two or more base stations each providing wireless connectivity with a base station cell, and a terminal device configured to communicate wirelessly with the base stations by a communication mode, wherein the method comprises a transmission phase during which positioning signals are sent from the base stations to arrive at the terminal device or sent from the terminal device to arrive at the base stations, measurements of arrival times of the positioning signals being obtained for use in triangulating a positon of the terminal device, and wherein during the transmission phase the base station sends or receives positioning signals when the terminal device is in an energy saving communication mode.

Paragraph 30. A base station for use in a wireless telecommunications network comprising a core network, two or more base stations, and a terminal device configured to communicate wirelessly with the base stations by a communication mode, wherein the base station comprises a controller unit and a transceiver unit and is configured to provide wireless connectivity within a base station cell, the base station further configured to: receive one or more positioning signals from the terminal device or send one or more positioning signals to the terminal device during a transmission phase of a positioning method for determining a position of the terminal device by triangulation using measured arrival times of the positioning signals, the terminal device being in an energy saving communication mode during the transmission phase.

Paragraph 31. Integrated circuitry for a base station for use in a wireless telecommunications network comprising a core network, two or more base stations and a terminal device configured to communicate wirelessly with the base stations by a communication mode, wherein the integrated circuitry comprises a controller element and a transceiver element configured to operate together to: enable the base station to provide wireless connectivity within a base station cell; and receive one or more positioning signals at the base station from the terminal device or send one or more positioning signals from the base station to the terminal device during a transmission phase of a positioning method for determining a position of the terminal device by triangulation using measured arrival times of the positioning signals, the terminal device being in an energy saving communication mode during the transmission phase.

REFERENCES

[1] Holma H. and Toskala A, "LTE for UMTS OFDMA and SC-FDMA based radio access", John Wiley and Sons, 2009

What is claimed is:
1. A method for use in a wireless telecommunications network, the wireless telecommunications network comprising a core network, two or more base stations each providing wireless connectivity within a base station cell, and a terminal device configured to communicate wirelessly with the base stations by a communication mode, the method being a positioning method for determining a position of the terminal device, and the method comprising:
   sending one or more positioning signals between the base stations and the terminal device during a transmission phase of the method, and using measured arrival times of the positioning signals to triangulate the position of the terminal device, wherein during the transmission phase the terminal device is in a Radio Resource Control (RRC) idle communication mode, wherein the RRC idle communication mode comprises discontinuous reception operation of the terminal device in which a cycle period of the discontinuous reception, based on a terminal identity, is shifted in time so that a start time of positioning occasions or paging occasions coincides with an end time of the paging occasions or the positioning occasions, respectively,
   wherein a coinciding paging occasion and positioning occasion both occur while the terminal device is still synchronized following a single downlink synchronization period,
   wherein a discontinuous reception operation signal is broadcast less frequently than a paging message, and
   transitioning the terminal device to a connected communication mode when the transmission phase ends for reporting reference signal time differences in the measured arrival times from the terminal device to elsewhere in the network.

2. The method according to claim 1, in which the method is an observed time difference of arrival method comprising sending positioning signals from the base stations to arrive at the terminal device.

3. The method according to claim 2, in which the RRC idle communication mode is an energy saving communication mode.

4. The method according to claim 2, further comprising configuring the terminal device for operation in the transmission phase using a connected communication mode before the transmission phase, and transitioning the terminal device into the RRC idle communication mode for the transmission phase.

5. The method according to claim 2, further comprising configuring the terminal device for operation in the transmission phase by broadcasting system information.

6. The method according to claim 2, further comprising configuring the terminal device for operation in the transmission phase while the terminal device is in the RRC idle communication mode by sending a paging message to the terminal device.

7. The method according to claim 2, in which an energy saving communication mode comprises the discontinuous reception operation of the terminal device in which the terminal device operates to receive paging messages during the paging occasions, and operates additionally to receive positioning signals during the positioning occasions during which the positioning signals are sent from the base stations.

8. The method according to claim 1, in which the transmission phase is ended after a predetermined number of arrival time measurements.

9. The method according to claim 1, in which the transmission phase is ended after a predetermined length of time.

10. The method according to claim 1, in which the transmission phase is ended by sending a paging message from the one or more base stations to the terminal device to notify the terminal device to cease arrival time measurement.

11. The method according to claim 1, in which the positioning occasions have a cycle time which is n times a cycle time of the paging occasions, where n is an integer equal to 1 or more.

12. The method according to claim 1, in which the method is an uplink time difference of arrival method comprising sending positioning signals from the terminal device to arrive at the base stations.

13. The method according to claim 12, in which the RRC idle communication mode is an energy saving communication mode.

14. The method according to claim 12, further comprising configuring the terminal device for operation in the transmission phase using a connected communication mode before the transmission phase, and transitioning the terminal device to the RRC idle communication mode for the transmission phase.

15. A method of operating a terminal device in a wireless telecommunications network to determine a position of the terminal device, the wireless communications network further comprising a core network and two or more base stations each providing wireless connectivity within a base station cell and the terminal device configured to communicate wirelessly with the base stations by a communication mode, the method comprising:
   a transmission phase during which positioning signals are sent from the base stations to arrive at the terminal device or sent from the terminal device to arrive at the base stations, measurements of arrival times of the positioning signals being obtained for use in triangulating the position of the terminal device, and the terminal device being in a Radio Resource Control (RRC) idle communication mode during the transmission phase, wherein the RRC idle communication mode comprises discontinuous reception operation of the terminal device in which a cycle period of the discontinuous reception, based on a terminal identity, is shifted in time so that a start time of positioning occasions or paging occasions coincides with an end time of the paging occasions or the positioning occasions, respectively,
   wherein a coinciding paging occasion and positioning occasion both occur while the terminal device is still synchronized following a single downlink synchronization period,
   wherein a discontinuous reception operation signal is broadcast less frequently than a paging message, and
   transitioning the terminal device to a connected communication mode when the transmission phase ends for reporting reference signal time differences in the measured arrival times from the terminal device to elsewhere in the network.

16. A terminal device for use in a wireless telecommunications network comprising the terminal device, a core network, and two or more base stations each providing wireless connectivity within a base station cell, wherein the terminal device comprises a controller unit and a transceiver unit and is configured to communicate wirelessly with the base stations by a communication mode, wherein the terminal device is further configured to:
   send one or more positioning signals to the base stations or receive positioning signals from the base stations during a transmission phase of a positioning method for determining a position of the terminal device by triangulation using measured arrival times of the positioning signals, the terminal device being in a Radio Resource Control (RRC) idle communication mode during the transmission phase, wherein the RRC idle communication mode comprises discontinuous reception operation of the terminal device in which a cycle period of the discontinuous reception, based on a terminal identity, is shifted in time so that a start time of the positioning occasions or the paging occasions coincides with an end time of the paging occasions or the positioning occasions, respectively, wherein a coinciding paging occasion and positioning occasion both occur while the terminal device is still synchronized following a single downlink synchronization period, and wherein a discontinuous reception operation signal is broadcast less frequently than a paging message, and transition to a connected communication mode when the transmission phase ends for reporting reference signal time differences in the measured arrival times from the terminal device to elsewhere in the network.

\* \* \* \* \*